(12) United States Patent
Yoshigahara

(10) Patent No.: US 7,831,110 B2
(45) Date of Patent: Nov. 9, 2010

(54) RESOLUTION CONVERTING METHOD

(75) Inventor: Noriyuki Yoshigahara, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 817 days.

(21) Appl. No.: 11/074,776

(22) Filed: Mar. 9, 2005

(65) Prior Publication Data

US 2005/0213852 A1 Sep. 29, 2005

(30) Foreign Application Priority Data

Mar. 24, 2004 (JP) ............................. 2004-086901
Feb. 24, 2005 (JP) ............................. 2005-049507

(51) Int. Cl.
*G06K 9/32* (2006.01)

(52) U.S. Cl. ...................... 382/300; 382/298; 382/299; 382/254; 382/275; 358/448

(58) Field of Classification Search .................. 382/300
See application file for complete search history.

(56) References Cited

U.S. PATENT DOCUMENTS

| | | | | | |
|---|---|---|---|---|---|
| 4,791,486 | A | * | 12/1988 | Spriggs et al. | 375/240.08 |
| 5,117,294 | A | * | 5/1992 | Yano | 358/447 |
| 5,430,811 | A | * | 7/1995 | Fukushima et al. | 382/254 |
| 5,570,436 | A | * | 10/1996 | Fukushima et al. | 382/300 |
| 5,650,858 | A | * | 7/1997 | Lund | 358/3.15 |
| 5,721,793 | A | * | 2/1998 | Ushida et al. | 382/300 |
| 5,875,268 | A | * | 2/1999 | Miyake | 382/276 |
| 6,061,151 | A | * | 5/2000 | Ono | 358/448 |
| 6,324,309 | B1 | * | 11/2001 | Tokuyama et al. | 382/300 |
| 6,438,274 | B1 | | 8/2002 | Tokuyama et al. | 382/298 |
| 6,697,539 | B1 | | 2/2004 | Dolan | 382/298 |
| 2001/0030756 | A1 | * | 10/2001 | Ohmori | 358/1.3 |
| 2003/0228067 | A1 | * | 12/2003 | Miyake et al. | 382/275 |

FOREIGN PATENT DOCUMENTS

| | | |
|---|---|---|
| EP | 1 308 887 A1 | 5/2003 |
| JP | 5064134 | 3/1993 |
| JP | 2000-69278 | 3/2000 |
| JP | 2002374407 | 12/2002 |
| JP | 2003051936 | 2/2003 |

OTHER PUBLICATIONS

Keys, Robert, "Cubic Convolution Interpolation for Digital Image Processing", IEEE Trans. on Acoustics, Speech, and Signal Processing, vol. ASSP-29, No. 6, Dec. 1981, pp. 1153-1160.
Japanese Office Action dated May 12, 2009 in JP counterpart 2005-049507.

* cited by examiner

*Primary Examiner*—Vu Le
*Assistant Examiner*—Tsung-Yin Tsai
(74) *Attorney, Agent, or Firm*—Fitzpatrick, Cella, Harper & Scinto

(57) ABSTRACT

The invention discloses a resolution converting method. Particularly, it discloses a resolution converting method having the steps of: inputting reference pixel data as pixel data which can be used for calculation of the pixel data of an interpolation pixel; and calculating the pixel data of the interpolation pixel by using a plurality of selected reference pixel data, wherein the selected plurality of reference pixel data include the reference pixel data which is selected in accordance with information corresponding to a position of the interpolation pixel in an area formed by mutually connecting positions of a plurality of adjacent pixels serving as a plurality of pixels adjacent to the interpolation pixel where the interpolation pixel is located.

5 Claims, 11 Drawing Sheets

(EDGE DIRECTION)

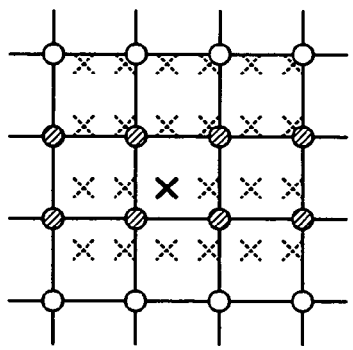
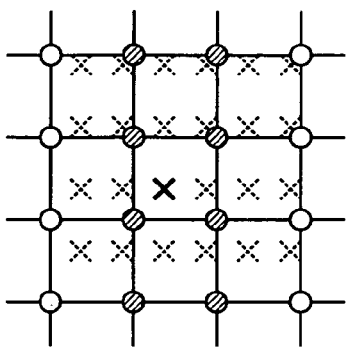
⊘ : REFERENCE PIXEL
× : INTERPOLATION PIXEL
FIG. 17
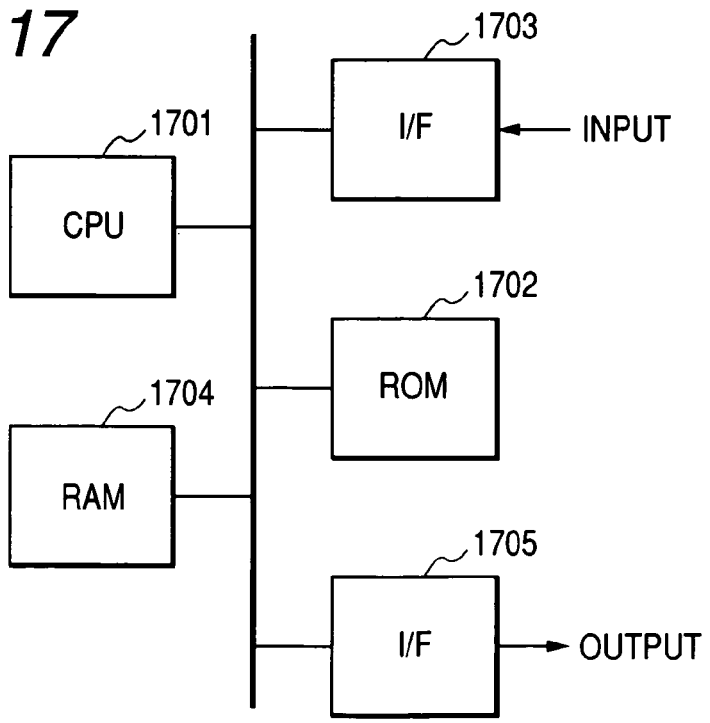

RESOLUTION CONVERTING METHOD

BACKGROUND OF THE INVENTION

1. Field of the Invention

The invention relates to a resolution converting method of image data.

2. Related Background Art

An example of a bilinear resolution converting method is shown below as a background art 1.

First, a coefficient table producing method will be described.

FIG. 9 is a flowchart for a coefficient table producing process in the background art 1. In a step 600 of producing an interpolation pixel position offset, a position offset of an interpolation pixel (interpolation pixel position offset) to a reference pixel which is necessary for producing the table is produced. In a step 601 of calculating coefficients, as shown in FIG. 10, interpolation pixel position offsets d(u) and d(v) calculated in the interpolation pixel position offset producing step are used and assuming that $$u \in \{0,1\}, v \in \{0,1\}, \quad (1)$$

corresponding coefficients K(u, v) are calculated by the following equation (2).

$$K(u, v) = \{1 - d(u)\}\{1 - d(v)\} \quad (2)$$

In a step 602 of storing the coefficients, the coefficients calculated in the coefficient calculating step 601 are stored into the corresponding location in the table.

A resolution converting method using such a table will now be described.

FIG. 8 is a processing flowchart for the resolution converting method in the background art 1. In a step 500 of calculating a reference address/interpolation pixel position offset, an address of the reference pixel and the position offset of the interpolation pixel (interpolation pixel position offset) to the reference pixel are calculated. In a coefficient deriving step 502, the interpolation pixel position offset calculated in the reference address/interpolation pixel position offset calculating step 500 is used as an index and coefficients are derived from the coefficient table which has previously been produced.

In a reference pixel deriving step 501, pixel data to be referred to is derived by using the reference address calculated in the reference address/interpolation pixel position offset calculating step 500 and the pixel data for the reference.

In an interpolation pixel producing step 503, the coefficient data derived in the coefficient deriving step 502 and the reference pixel data derived in the reference pixel deriving step 501 are used and by multiplying a reference pixel by each of the corresponding coefficients and calculating the sum of the multiplication results, the interpolation pixel data is derived. In an interpolation pixel storing step 504, the interpolation pixel data produced in the interpolation pixel producing step 503 is stored into a memory.

In the background art 1 as mentioned above, there is such a problem that an image is blurred and an adequate picture quality cannot be derived.

An example of a cubic convolution resolution converting method will be described hereinbelow as a background art 2.

Since a coefficient table producing process and a resolution converting process are almost the same as those in the background art 1, only different points will be explained hereinbelow.

Unlike the background art 1, in the coefficient calculating step 601 in the coefficient table producing process, the corresponding coefficients K(u, v) are calculated by using the interpolation pixel position offsets d(u) and d(v) calculated in the interpolation pixel position offset producing step as shown in FIG. 11. Now, assuming that $$u \in \{0, 1, 2, 3\}, v \in \{0, 1, 2, 3\}, \quad (3)$$

$$k = \begin{cases} 1 - 2|d| + |d|^2 + |d|^3 & \text{if } 0 \le |d| < 1 \\ 4 - 8|d| + 5|d|^2 - |d|^3 & \text{if } 1 \le |d| < 2 \\ 0 & \text{if } 2 \le |d| \end{cases}$$

the coefficients are calculated by the following equation (4).

$$K(u, v) = k(d(u))k(d(v)) \quad (4)$$

Also in the resolution converting process, a similar process is executed with respect to 16 neighborhood pixels of the interpolation pixel instead of 4 pixels adjacent to the interpolation pixel.

According to the background art 2 as mentioned above, while high frequency components are held and a high picture quality can be derived without blurring an image, since the number of reference pixels is large, there are such problems that the number of memory accessing times is large, an amount of arithmetic operation is large, and a circuit scale increases in the case of realizing such a background art by hardware and a processing burden is heavy in the case of realizing it by software.

As a method of solving such problems, there is a resolution converting method disclosed in Japanese Patent Application Laid-Open No. 2000-69278 and such a method is mentioned as a background art 3.

An embodiment of the resolution converting method of the background art 3 will be described hereinbelow.

First, a coefficient table producing method will be described.

FIG. 13 is a flowchart for the coefficient table producing process in the background art 3. In an interpolation pixel position offset producing step 800, a position offset of an interpolation pixel (interpolation pixel position offset) to the reference pixels necessary for producing a table is produced. In a first coefficient calculating step 801, as shown in an example of FIG. 14, assuming that $$u \in \{0,1\}, \quad (5)$$

in accordance with the interpolation pixel position offset d(u) produced in the interpolation pixel position offset producing step 800, the corresponding coefficient K(u) is calculated by the following equation (6).

$$K(u, v) = 1 - d(u) \quad (6)$$

In a first coefficient storing step 802, the coefficient calculated in the first coefficient calculating step 801 is stored in a corresponding location in the table.

In a second coefficient calculating step 803, as shown in an example of FIG. 15, assuming that $$u \in \{0, 1, 2, 3\}, \quad (7)$$

-continued $$k = \begin{cases} 1 - 2|d| + |d|^2 + |d|^3 & \text{if } 0 \le |d| < 1 \\ 4 - 8|d| + 5|d|^2 - |d|^3 & \text{if } 1 \le |d| < 2 \\ 0 & \text{if } 2 \le |d| \end{cases}$$

in accordance with the interpolation pixel position offset d(u) produced in the interpolation pixel position offset producing step 800, the corresponding coefficient K(u) is calculated by the following equation (8).

$$K(u)=k(d(u)) \tag{8}$$

In a second coefficient storing step 804, the coefficient calculated in the second coefficient calculating step 803 is stored in a corresponding location in the table.

A resolution converting process using the table will now be described.

FIG. 12 is a processing flowchart for the resolution converting method in the background art 3. In a horizontal direction reference address/interpolation pixel position offset calculating step 702, an address of the reference pixel and the position offset of the interpolation pixel in the horizontal direction (horizontal direction interpolation pixel position offset) to the reference pixel are calculated. In a vertical direction reference address/interpolation pixel position offset calculating step 703, an address of the reference pixel and the position offset of the interpolation pixel in the vertical direction (vertical direction interpolation pixel position offset) to the reference pixel are calculated.

In an edge detecting step 700, an edge direction is calculated from the image before the resolution converting process by using the pixel data for reference. In an interpolation system determining step 701, as shown in FIGS. 16A and 16B, an interpolation system according to the edge direction detected in the edge detecting step 700 is determined.

In the interpolation system determining step 701, if it is determined that an edge component amount in the vertical direction of the image is large, the following series of processes is executed.

In a horizontal direction first coefficient deriving step 705, the horizontal direction interpolation pixel position offset calculated in the horizontal direction reference address/interpolation pixel position offset calculating step 702 is used as an index and coefficients are derived from a coefficient table which has previously been produced. In a horizontal direction first reference pixel deriving step 704, pixel data to be referred to is derived by using the horizontal direction reference address calculated in the horizontal direction reference address/interpolation pixel position offset calculating step 702 and the pixel data for reference. In a horizontal direction first interpolation pixel producing step 706, the coefficient data derived in the horizontal direction first coefficient deriving step 705 and the reference pixel data derived in the horizontal direction first reference pixel deriving step 704 are used, each reference pixel is multiplied by each of the corresponding coefficients, and the sum of the multiplication results is calculated, thereby deriving the horizontal direction interpolation pixel data. In a horizontal direction first interpolation pixel storing step 707, the interpolation pixel data produced in the horizontal direction first interpolation pixel producing step 706 is stored into a memory.

In a vertical direction second interpolation pixel producing step 709, the vertical direction interpolation pixel position offset calculated in the vertical direction reference address/interpolation pixel position offset calculating step 703 is used as an index and coefficients are derived from a coefficient table which has previously been produced. In a vertical direction second reference pixel deriving step 708, pixel data to be referred to is derived by using the vertical direction reference address calculated in the vertical direction reference address/interpolation pixel position offset calculating step 703 and the pixel data stored in the horizontal direction first interpolation pixel storing step 707. In a vertical direction second interpolation pixel producing step 710, the coefficient data derived in the vertical direction second coefficient deriving step 709 and the reference pixel data derived in the vertical direction second reference pixel deriving step 708 are used, each reference pixel is multiplied by each of the corresponding coefficients, and the sum of the multiplication results is calculated, thereby deriving the interpolation pixel data. In an interpolation pixel storing step 718, the interpolation pixel data produced in the vertical direction second interpolation pixel producing step 710 is stored into the memory.

If it is determined in the interpolation system determining step 701 that an edge component amount in the horizontal direction of the image is large, the following series of processes is executed.

In a horizontal direction second coefficient deriving step 711, the horizontal direction reference address/interpolation pixel position offset calculated in the horizontal direction reference address/interpolation pixel position offset calculating step 702 is used as an index and a coefficient is derived from the coefficient table which has previously been produced. In a horizontal direction second reference pixel deriving step 712, pixel data to be referred to is derived by using the horizontal direction reference address calculated in the horizontal direction reference address/interpolation pixel position offset calculating step 702 and the pixel data for reference. In a horizontal direction second interpolation pixel producing step 713, the coefficient data derived in the horizontal direction second coefficient deriving step 711 and the reference pixel data derived in the horizontal direction second reference pixel deriving step 712 are used, each reference pixel is multiplied by each of the corresponding coefficients, and the sum of the multiplication results is calculated, thereby deriving the horizontal direction interpolation pixel data. In a horizontal direction second interpolation pixel storing step 714, the interpolation pixel data produced in the horizontal direction second interpolation pixel producing step 713 is stored into the memory.

In a vertical direction first coefficient deriving step 715, the vertical direction interpolation pixel position offset calculated in the vertical direction reference address/interpolation pixel position offset calculating step 703 is used as an index and a coefficient is derived from the coefficient table which has previously been produced. In a vertical direction first interpolation pixel deriving step 716, the pixel data to be referred to is derived by using the vertical direction reference address calculated in the vertical direction reference address/interpolation pixel position offset calculating step 703 and the pixel data stored in the horizontal direction second interpolation pixel storing step 714. In a vertical direction first interpolation pixel producing step 717, the coefficient data derived in the vertical direction first coefficient deriving step 715 and the reference pixel data derived in the vertical direction first reference pixel deriving step 716 are used, each reference pixel is multiplied by each of the corresponding coefficients, and the sum of the multiplication results is calculated, thereby deriving the interpolation pixel data. In the interpolation pixel storing step 718, the interpolation pixel data produced in the vertical direction first interpolation pixel producing step 717 is stored into the memory.

As mentioned above, in the background art 3, the bilinear interpolation is executed in the horizontal direction first interpolation pixel producing step 706 and the vertical direction first interpolation pixel producing step 717. The cubic convolution interpolation is executed in the horizontal direction second interpolation pixel producing step 713 and the vertical direction second interpolation pixel producing step 710. If it is determined that edge component amount in the vertical direction of the image is large, the first interpolation pixel producing step 706 is executed in the horizontal direction and the second interpolation pixel producing step 710 is executed in the vertical direction. If it is determined that edge component amount in the horizontal direction of the image is large, the second interpolation pixel producing step 713 is executed in the horizontal direction and the first interpolation pixel producing step 717 is executed in the vertical direction. Thus, the edge portion is not blurred and the picture quality in which a pseudo outline is suppressed can be obtained while reducing a circuit scale of the hardware.

SUMMARY OF THE INVENTION

A resolution conversion by which a high picture quality can be obtained is demanded. It is an object of the invention to realize a novel and excellent resolution converting technique.

A construction of the invention which can accomplish the above object will now be described. To assist better understanding of the invention, an example of a specific construction will be also mentioned here.

One of the inventions of a resolution converting method according to the invention is constructed as follows. That is, there is provided a resolution converting method of converting resolution of image data, comprising the steps of:

inputting reference pixel data as pixel data which can be used for calculation of the pixel data of an interpolation pixel; and calculating the pixel data of the interpolation pixel by using a plurality of selected reference pixel data, wherein the selected plurality of reference pixel data include the reference pixel data which is selected in accordance with information corresponding to a position of the interpolation pixel in an area formed by mutually connecting positions of a plurality of adjacent pixels serving as a plurality of pixels adjacent to the interpolation pixel where the interpolation pixel is located.

In the case of calculating the pixel data of a plurality of interpolation pixels, as information corresponding to the position of the interpolation pixel in the area, information which has previously been obtained in correspondence to each interpolation pixel can be used or the information can be also obtained each time the pixel data of each interpolation pixel is calculated. If one or a plurality of resolution of the image data which is inputted has/have also been predetermined and one or a plurality of resolution of the image data to be outputted has/have been predetermined, one or a plurality of conditions for changing the resolution can be predetermined. Therefore, such information can be determined before shipping an apparatus for executing the resolution conversion, for example, at the time of manufacturing or the like of such an apparatus. In this case, a process for obtaining such information does not need to be executed after the shipping of the apparatus. The information corresponding to the position of the interpolation pixel in such an area can be in various formats. Such information does not need to strictly show the position of the interpolation pixel in such an area. For example, there is such a preferable construction to be used that parameters each corresponding to one of a plurality of subareas in such an area are provided and allow recognizing in which subarea the interpolation pixel exists.

It is possible to preferably use such a construction that the information is information in which the pixel data corresponding to a predetermined pixel among a plurality of neighborhood pixels serving as a plurality of pixels which are located outside of such an area with respect to the interpolation pixel and are located near the interpolation pixel is selected as reference pixel data, and among the plurality of neighborhood pixels, the pixel data corresponding to another predetermined pixel in which a distance from a position of a center of gravity of the area is the same as that of the predetermined pixel and a distance from the interpolation pixel is larger than a distance between the predetermined pixel and the interpolation pixel is not selected as reference pixel data.

In the invention, the position of the pixel does not need to be specified by the position of the pixel in the image which is actually displayed but it is sufficient that it can be determined as a virtual position. The center of gravity of the area denotes the position of the center of gravity in the case where mass is uniformly distributed in the area.

It is also possible to preferably use such a construction that the selected plurality of reference pixel data include the pixel data corresponding to the plurality of adjacent pixels.

It is also possible to preferably use such a construction that on a virtual plane which is presumed by the image data, the pixels are located at crossing points of a plurality of straight lines extending in the vertical direction of the image and a plurality of straight lines extending in the horizontal direction of the image. In this case, four pixels locating in the positions of four vertices of a rectangle can be used as a plurality of adjacent pixels. It is also possible to preferably use such a construction that the pixel data of eight pixels constructed by a combination of four pixels which are variable in accordance with the foregoing information and those four adjacent pixels is used as selected reference pixel data. By setting the number of selected reference pixel data to 8, a multiplication-addition arithmetic operation of an SIMD (Single Instruction Multiple Data) arithmetic operation of a 64/128-bit processor can be effectively used.

The invention of another resolution converting method according to the invention is constructed as follows.

That is, there is provided a resolution converting method of converting resolution of image data, comprising the steps of:

inputting reference pixel data as pixel data which can be used for calculation of the pixel data of an interpolation pixel; and calculating the pixel data of the interpolation pixel by using a plurality of selected reference pixel data, wherein the selected plurality of reference pixel data are pixel data existing near the interpolation pixel and corresponding to a plurality of pixels constructing a predetermined layout pattern, and the predetermined layout pattern is selected from a plurality of layout patterns in correspondence to a direction of an edge near the interpolation pixel of an image to be formed by the image data, and the plurality of layout patterns include a layout pattern corresponding to a direction of an edge which is oblique to a horizontal direction of the image to be displayed.

In the above construction, it is possible to preferably use such a construction that any of the layout pattern includes four pixels which are closest to the interpolation pixel.

In each of the foregoing inventions, it is possible to preferably use such a construction that the calculation of the pixel data of the interpolation pixel includes at least an interpolation arithmetic operation by a nonlinear function using the selected plurality of reference pixel data.

It is preferable that the calculation of the pixel data of the interpolation pixel is executed by using a parameter according to a distance between each of the pixels corresponding to the selected plurality of reference pixel data and the interpolation pixel. Such a parameter can be also used as information mentioned above. For example, if the calculation of the pixel data of the interpolation pixel includes an arithmetic operation for multiplying the pixel data of the reference pixel by the parameter, by setting a significant value as a parameter corresponding to the reference pixel data to be selected and setting 0 as a parameter corresponding to the reference pixel data which should not be selected, contribution of the reference pixel data which should not be selected to the multiplication arithmetic operation can be set to 0. Thus, the arithmetic operation using only the reference pixel data to be selected can be executed.

The present invention includes the invention of an image data processing apparatus and it is constructed as follows.

That is, there is provided an image data processing apparatus for converting resolution of image data, comprising:

an inputting unit for inputting reference pixel data as pixel data which can be used for calculation of the pixel data of an interpolation pixel; and an arithmetic operating circuit for calculating the pixel data of the interpolation pixel by using a plurality of selected reference pixel data, wherein the selected plurality of reference pixel data include the reference pixel data which is selected in accordance with information corresponding to a position of the interpolation pixel in an area formed by mutually connecting positions of a plurality of adjacent pixels serving as a plurality of pixels adjacent to the interpolation pixel where the interpolation pixel is located.

The following apparatus is mentioned as another construction of the image data processing apparatus.

That is, there is provided an image data processing apparatus for converting resolution of image data, comprising:

an inputting unit for inputting reference pixel data as pixel data which can be used for calculation of the pixel data of an interpolation pixel; and an arithmetic operating circuit for calculating the pixel data of the interpolation pixel by using a plurality of selected reference pixel data, wherein the selected plurality of reference pixel data are pixel data existing near the interpolation pixel and corresponding to a plurality of pixels constructing a predetermined layout pattern, and the predetermined layout pattern is selected from a plurality of layout patterns in correspondence to a direction of an edge near the interpolation pixel of an image to be formed by the image data, and the plurality of layout patterns include a layout pattern corresponding to a direction of an edge which is oblique to a horizontal direction of the image to be displayed.

As an arithmetic operating circuit of the image data processing apparatus, a general CPU, a dedicated ASIC constructed so that the above processes can be executed, an FPGA which has been programmed so that the above processes can be executed, or the like can be used.

The present invention incorporates the invention of a resolution converting program and it is constructed as follows.

That is, there is provided a resolution converting program for converting resolution of image data constructed in such a manner that an arithmetic operating circuit is allowed to execute a step of using a plurality of reference pixel data selected from the reference pixel data as pixel data which can be used for calculation of the pixel data of an interpolation pixel and calculating the pixel data of the interpolation pixel, wherein the selected plurality of reference pixel data include the reference pixel data which is selected in accordance with information corresponding to a position of the interpolation pixel in an area formed by mutually connecting positions of a plurality of adjacent pixels serving as a plurality of pixels adjacent to the interpolation pixel where the interpolation pixel is located.

There is provided a resolution converting program for converting resolution of image data constructed in such a manner that an arithmetic operating circuit is allowed to execute a step of using a plurality of reference pixel data selected from the reference pixel data as pixel data which can be used for calculation of the pixel data of an interpolation pixel and calculating the pixel data of the interpolation pixel, wherein the selected plurality of reference pixel data are pixel data existing near the interpolation pixel and corresponding to a plurality of pixels constructing a predetermined layout pattern, and the predetermined layout pattern is selected from a plurality of layout patterns in correspondence to a direction of an edge near the interpolation pixel of an image to be formed by the image data, and the plurality of layout patterns include a layout pattern corresponding to a direction of an edge which is oblique to a horizontal direction of the image to be displayed.

As a program for executing the arithmetic operation in the general CPU mentioned above or a program for setting a gate structure of a programmable arithmetic operating apparatus such as an FPGA mentioned above, those programs can be implemented in a built-in type storing medium such as a hard disk or a semiconductor memory, a portable storing medium such as CD-ROM, flexible disk, DVD disk, magnetooptic disk, IC card, or the like, or a transmitting medium such as a communication cable or the like.

The preferable resolution conversion can be realized according to the present invention.

BRIEF DESCRIPTION OF THE DRAWINGS

FIG. 17 is a diagram showing a constructional example of an arithmetic operating apparatus functioning as a resolution converting apparatus.

DETAILED DESCRIPTION OF THE PREFERRED EMBODIMENTS

First Embodiment

A resolution converting method according to the first embodiment of the invention will be described hereinbelow.

Figure 1:
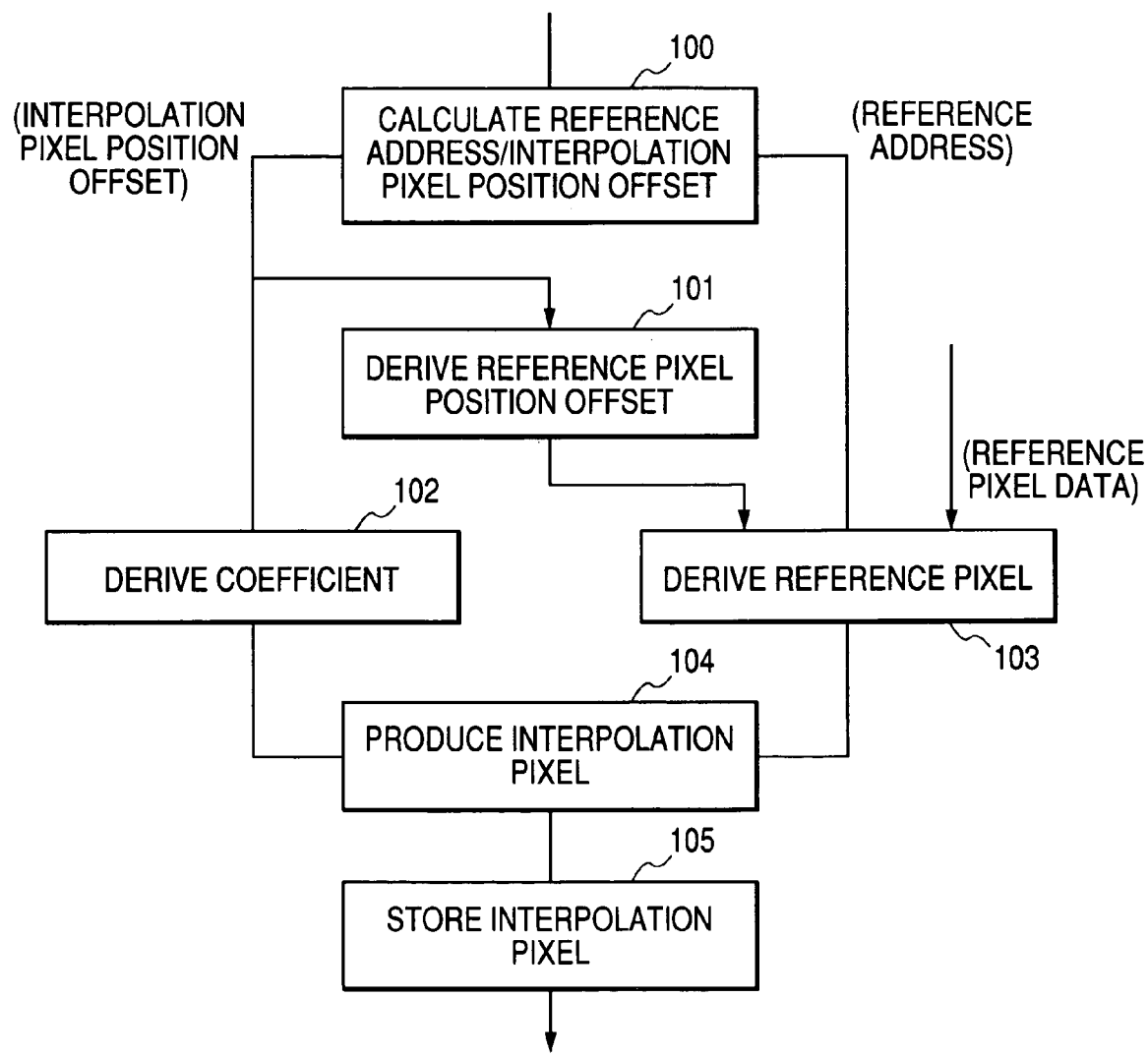
FIG. 1 is a flowchart for a resolution converting process in the first embodiment of the invention.
Figure 2:
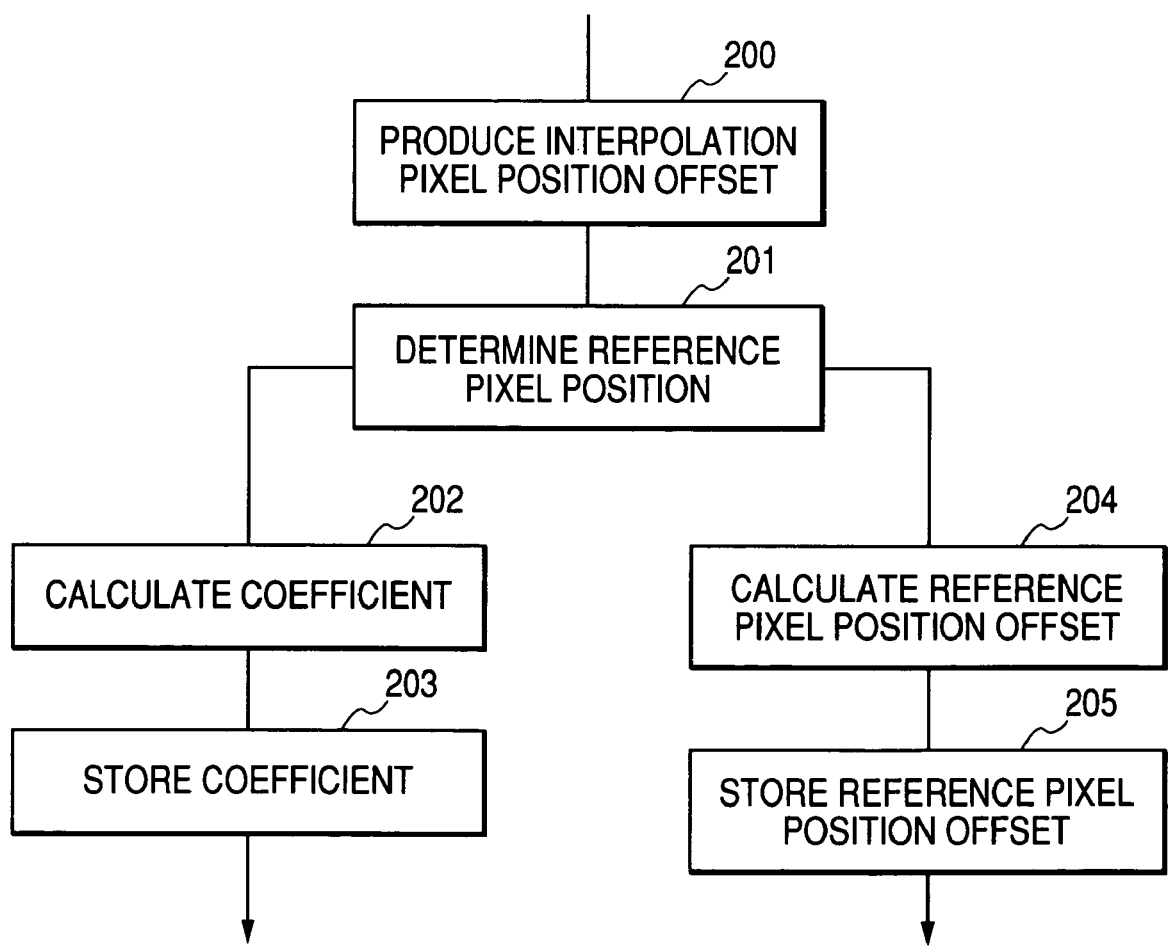
FIG. 2 is a flowchart for a table producing process in the first embodiment of the invention.

FIG. 1 is a processing flowchart for the resolution converting method according to the embodiment. FIG. 2 is a flowchart for a coefficient/reference pixel position offset table producing process according to the resolution converting method.

First, a coefficient/reference pixel position offset table producing method will be described with reference to FIG. 2. It is assumed that a processing flow shown in FIG. 2 is executed as a preparation stage prior to an actual resolution converting process.

As shown in FIG. 2, in an interpolation pixel position offset producing step 200, a position offset of an interpolation pixel (interpolation pixel position offset) to a reference pixel necessary for producing the table is produced. The position offset of the interpolation pixel indicates the position of the interpolation pixel in a rectangular area in which positions of four pixels which are closest to the interpolation pixel are set to vertices.

Subsequently, in a reference pixel position determining step 201, as shown in FIGS. 3A to 3E, a pixel which should be referred to is determined in accordance with the interpolation pixel position offset produced in the interpolation pixel position offset producing step 200. In FIGS. 3A to 3E, each pixel is displayed by a circle. The pixel to be referred to in the case where the interpolation pixel is located in each hatched area in an area surrounded by four pixels at the center is shown by a hatched circle. As shown in FIGS. 3A to 3E, a position of the pixel to be referred to differs in accordance with the hatched area of the interpolation pixel. Now, assuming that a two-dimensional coordinate system is shown by a coordinate system (u, v) based on an axis extending in the vertical direction in the diagram and an axis extending in the lateral direction in the diagram, in the construction of the embodiment, all positions (1, 0), (2, 0), (0, 1), (0, 2), (1, 3), (2, 3), (3, 1), and (3, 2) are located at an equal distance from the position of the center of gravity of a rectangular area in which the positions (1, 1), (2, 1), (1, 2), and (2, 2) of the four adjacent pixels are set to vertices.

Figure 3:
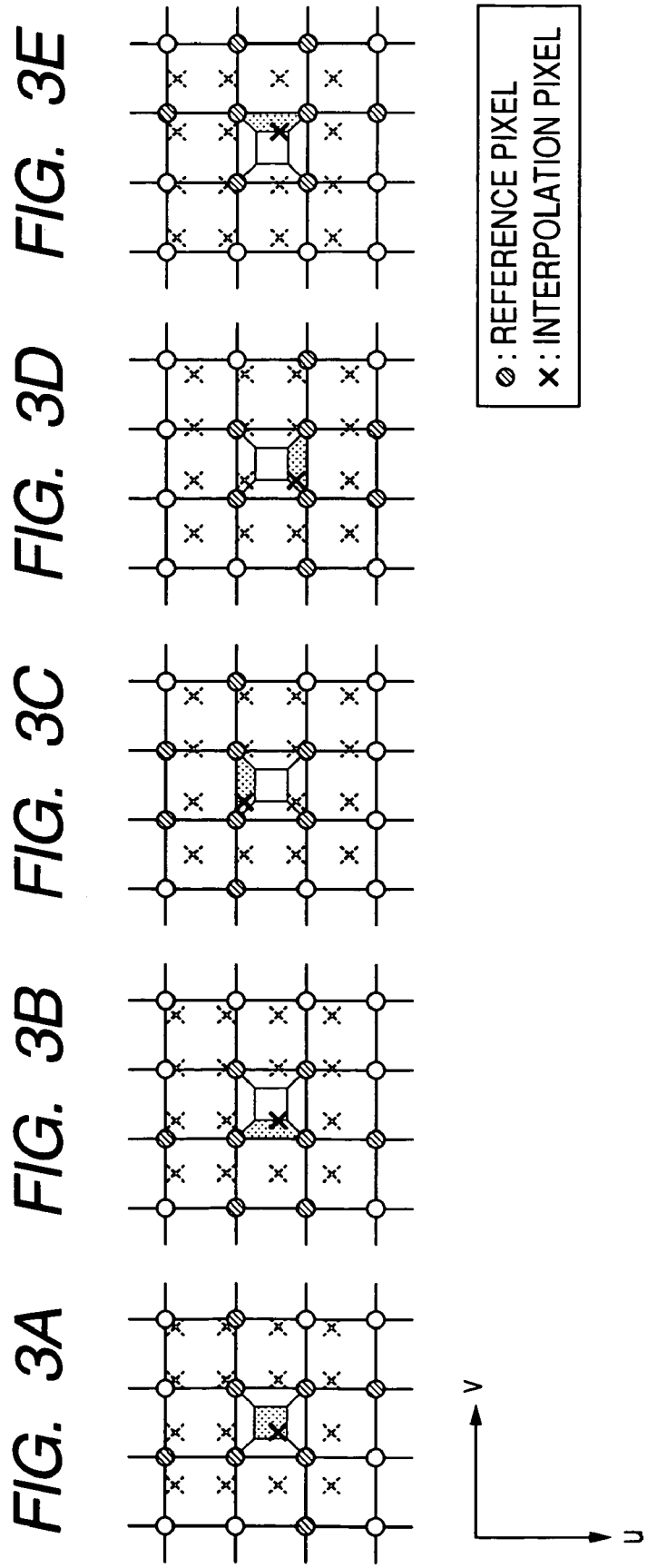
FIGS. 3A, 3B, 3C, 3D and 3E are explanatory diagrams 1 of the operation in the first embodiment of the invention.

In FIG. 3B, the interpolation pixel is located on the left side in the diagram from the position of the center of gravity mentioned above and the following relation is satisfied.

[Distance between the pixel of (1, 0) and the interpolation pixel]<[Distance between the pixel of (1, 3) and the interpolation pixel]

The pixel of (1, 0) becomes the selected reference pixel and is used for calculation of the pixel data of the interpolation pixel. The pixel of (1, 3) does not become the selected reference pixel and is not used for calculation of the pixel data of the interpolation pixel.

In FIG. 3E, the interpolation pixel is located on the right side in the diagram from the position of the center of gravity mentioned above and the following relation is satisfied.

[Distance between the pixel of (1, 0) and the interpolation pixel]>[Distance between the pixel of (1, 3) and the interpolation pixel]

The pixel of (1, 3) becomes the selected reference pixel and is used for calculation of the pixel data of the interpolation pixel. The pixel of (1, 0) does not become the selected reference pixel and is not used for calculation of the pixel data of the interpolation pixel.

The case where the interpolation pixel is located in the upper position in the diagram from the position of the center of gravity mentioned above is shown in FIG. 3C and the case where it is located in the lower position is shown in FIG. 3D. When comparing the pixel of (0, 1) with the pixel of (3, 1), in the construction of FIG. 3C, the former pixel is closer to the interpolation pixel, the former pixel of the case becomes the selected reference pixel, and the latter pixel of the case is not selected.

It is not always necessary that the above conditions are satisfied upon calculation of the pixel data of all interpolation pixel. For example, in the embodiment, the inside of the rectangular area in which the positions (1, 1), (2, 1), (1, 2), and (2, 2) of four adjacent pixels are set to the vertices is divided into five subareas. A subarea (FIG. 3B) on the right side in the diagram, a subarea (FIG. 3E) on the left side in the diagram, a subarea (FIG. 3C) on the upper side in the diagram, and a subarea (FIG. 3D) on the lower side in the diagram are set in the rectangular area in which the positions (1, 1), (2, 1), (1, 2), and (2, 2) of the four adjacent pixels are set to the vertices. Further, another subarea (FIG. 3A) is also provided near the center in the rectangular area in which the positions (1, 1), (2, 1), (1, 2), and (2, 2) of the four adjacent pixels are set to the vertices. To which pixel the interpolation pixel existing in the subarea of FIG. 3A is closer can be discriminated. In the case where the interpolation pixel exists in the subarea, however, since differences among the distances between the interpolation pixel and the pixels existing at the positions of (1, 0), (2, 0), (0, 1), (0, 2), (1, 3), (2, 3), (3, 1), and (3, 2) are small, a construction in which such a discrimination is not executed is used.

Figure 4:
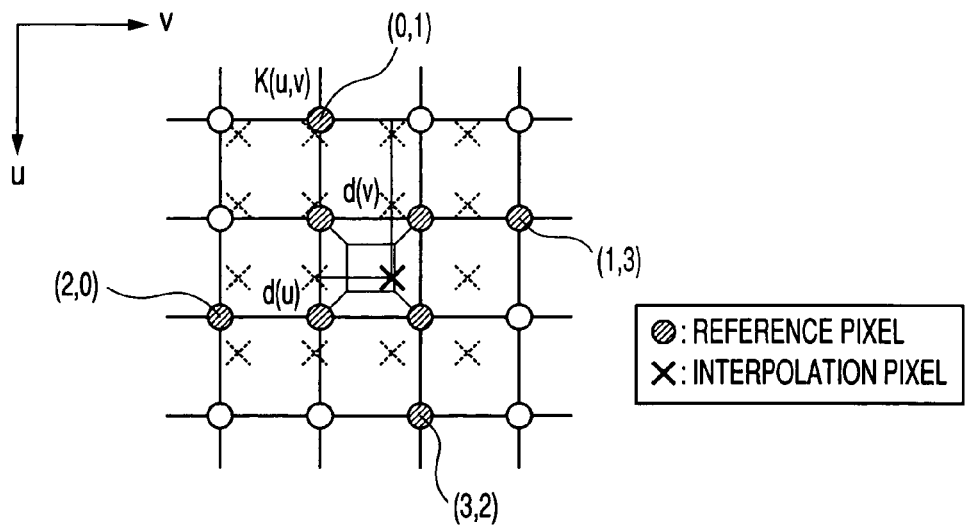
FIG. 4 is an explanatory diagram 2 of the operation in the first embodiment of the invention.

Subsequently, in a coefficient calculating step 202, the corresponding coefficient is calculated in accordance with the reference pixel position calculated in the reference pixel position determining step 201 as shown in an example of FIG. 4. In FIG. 4, the pixels to be referred to from the position of the interpolation pixel are eight pixels shown as hatched circles. A cubic convolution resolution converting method of executing an interpolation arithmetic operation by a nonlinear function is used. When the position of each of 3-dimensional pixels is shown by a 2-dimensional coordinate system (u, v) in which the upper left position is set to an origin and two coordinate axes extend downwardly and to the right, the positions of the pixels to be referred to are shown by the following equation (9).

$$N=\{(0,1),(1,1),(1,2),(1,3),(2,0),(2,1),(2,2),(3,2)\} \quad (9)$$

Now, assuming that $$sum = \sum_{(u,v)\in N} (d(u))k(d(v)), \quad (10)$$

$$k = \begin{cases} 1 - 2|d| + |d|^2 + |d|^3 & \text{if } 0 \le |d| < 1 \\ 4 - 8|d| + 5|d|^2 - |d|^3 & \text{if } 1 \le |d| < 2 \\ 0 & \text{if } 2 \le |d| \end{cases}$$

the coefficients corresponding to the positions of the pixels to be referred to are shown by the following equation (11).

$$K(u, v)=(d(u))k(d(v))/sum \ (u, v) \in N \quad (11)$$

where, d(u): distance on a u axis between the selected reference pixel and the interpolation pixel
d(v): distance on a v axis between the selected reference pixel and the interpolation pixel Subsequently, in a coefficient storing step 203, the coefficients calculated in the coefficient calculating step 202 are stored into the corresponding location in the table.

In a reference pixel position offset calculating step 204, a position offset of the reference pixel (reference pixel position offset) to the address of the reference pixel (hereinbelow, referred to as a reference address) is calculated in accordance with the reference pixel position calculated in the reference pixel position determining step 201. In a reference pixel position offset storing step 205, the reference pixel position offset calculated in the reference pixel position offset calculating step 204 is stored into the corresponding location in the table. The reference pixel position offset is obtained by replacing the address of the reference pixel by a relative address in a range of 4×4 pixels where the interpolation pixel is positioned to a location near the center so that the following resolution converting process can be smoothly executed in the arithmetic operating circuit. Specifically speaking, the reference pixel position offset indicates a relative position of the selected reference pixel to the pixel of (0, 0) in FIG. 4.

If a relation between the resolution of the input image data and that of the output image data has been predetermined, it is also possible to execute the flow shown in FIG. 2 before shipping (upon manufacturing or the like) of the apparatus for executing the resolution conversion, which will be explained here, and preliminarily store each of the foregoing coefficients and the reference pixel position offset into such an apparatus. In a construction in which the resolution is arbitrarily designated, the above processes are executed in accordance with the designated resolution and the contents in the coefficient table and the reference pixel position offset table are maintained until the conditions of the resolution are changed after that.

The resolution converting process using the coefficient table and the reference pixel position offset table will now be described with reference to FIG. 1.

First, in a reference address/interpolation pixel position offset calculating step 100, the reference address and the position offset of the interpolation pixel (interpolation pixel position offset) to the reference pixel are calculated.

Subsequently, in a coefficient deriving step 102, the interpolation pixel position offset calculated in the reference address/interpolation pixel position offset calculating step 100 is used as an index and coefficients are derived from the coefficient table which has previously been produced.

In a reference pixel position offset deriving step 101, the reference address calculated in the reference address/interpolation pixel position offset calculating step 100 is used as an index and the position offset of the reference pixel (reference pixel position offset) to the reference address is derived from the reference pixel position offset table which has previously been produced.

Subsequently, in a reference pixel deriving step 103, reference pixel data to be selected is derived from the pixel data for the reference which is inputted by using the reference address calculated in the reference address/interpolation pixel position offset calculating step 100 and the reference pixel position offset calculated in the reference pixel position offset deriving step 101. The pixel data for the reference is the pixel data prior to executing the resolution converting process. Thus, the pixel data (selected reference pixel data) necessary for calculation of the pixel data of the interpolation pixel is obtained.

Subsequently, in an interpolation pixel producing step 104, the coefficient data derived in the coefficient deriving step 102 and the reference pixel data selected in the reference pixel deriving step 103 are used and by multiplying each reference pixel by each of the corresponding coefficients and calculating the sum of the multiplication results, the interpolation pixel data is derived.

Subsequently, in an interpolation pixel storing step 105, the interpolation pixel data produced in the interpolation pixel producing step 104 is stored into a memory.

The processes shown in FIG. 1 are executed every interpolation pixel.

Although the method of calculating the coefficients in a lump at the time of production of the table has been shown as a coefficient calculating method in the embodiment, it is also possible to use a method of calculating them simultaneously with the production of the interpolation pixel without producing the table or a method whereby a part of the coefficients (coefficients for one dimension, and the like) are calculated at the time of production of the table and the residual coefficients are calculated (coefficients for two dimensions are calculated from the coefficients for one dimension, etc.) simultaneously with the production of the interpolation pixel.

Although five patterns have been prepared as reference patterns for the interpolation arithmetic operation in the embodiment, the number of patterns is not limited to 5.

The processing steps in the first and second embodiments can be executed by using the arithmetic operating apparatus having: a CPU as an arithmetic operating circuit; a RAM or a ROM as a storing circuit; and the like. The arithmetic operating apparatus functions as a resolution converting apparatus. A construction of the arithmetic operating apparatus is shown in FIG. 17.

The arithmetic operating apparatus of FIG. 17 has: a CPU 1701 as an arithmetic operating circuit; a ROM 1702 as a memory for storing a program to execute the foregoing processes; an interface 1703 as an inputting unit for inputting image data; a RAM 1704 as a memory for storing pixel data constructing the image data prior to executing the resolution conversion and the foregoing coefficients and offset; and an interface 1705 as an outputting unit for outputting the resolution-converted image data (including at least the pixel data of the interpolation pixel). In the case where the program to execute the resolution conversion of the invention is enabled to be supplied from the outside, it is proper to use a rewritable memory as a ROM 1702. At least a part of those component elements can be also integrated onto one printed circuit board.

According to the embodiment, by changing a combination of the four adjacent reference pixels which are neighboring to the interpolation pixel and the remote reference pixels which are further away from the interpolation pixel, the interpolation arithmetic operation can be executed only by using the reference pixels whose distances from the interpolation pixel are shorter. Thus, the excellent picture quality can be obtained while suppressing the processing costs.

(Second Embodiment)

A resolution converting method according to the second embodiment of the invention will be described hereinbelow.

Figure 5:
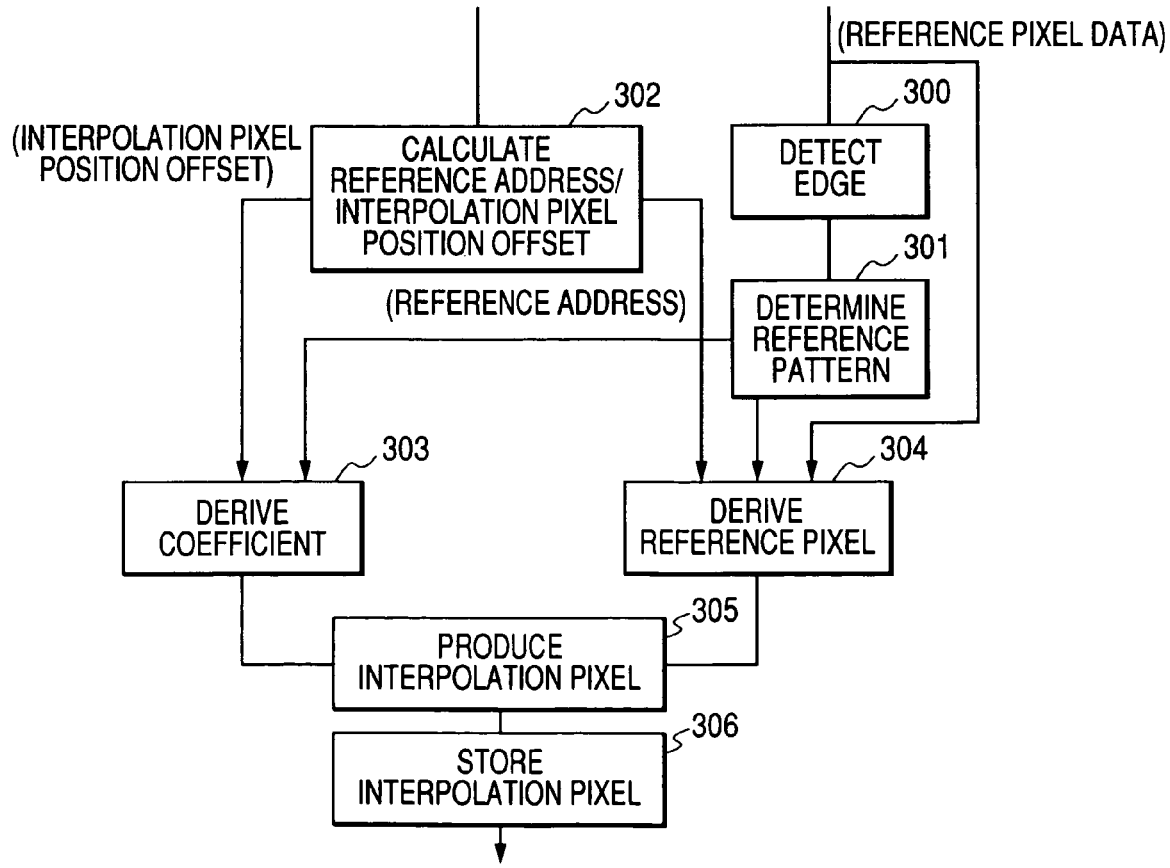
FIG. 5 is a flowchart for a resolution converting process in the second embodiment of the invention.
Figure 6:
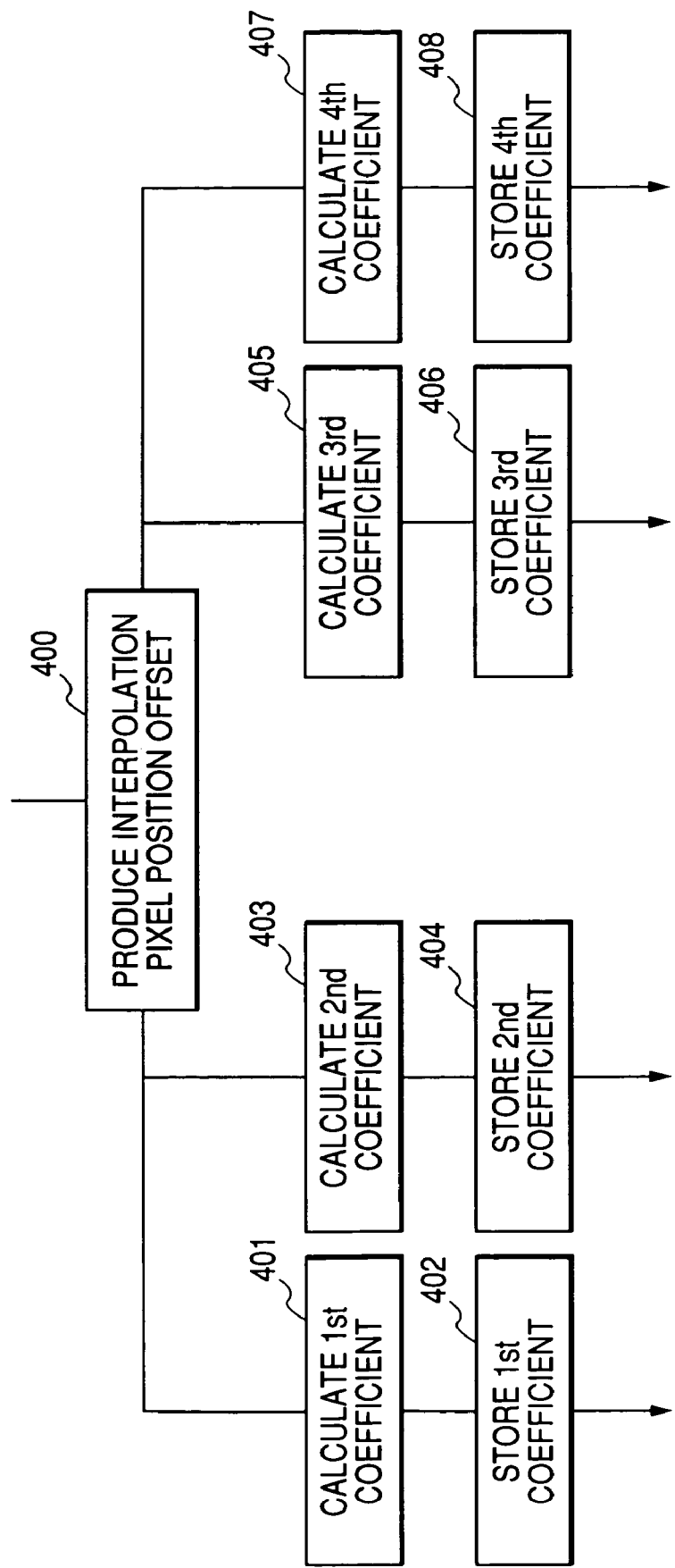
FIG. 6 is a flowchart for a table producing process in the second embodiment of the invention.
Figure 7:
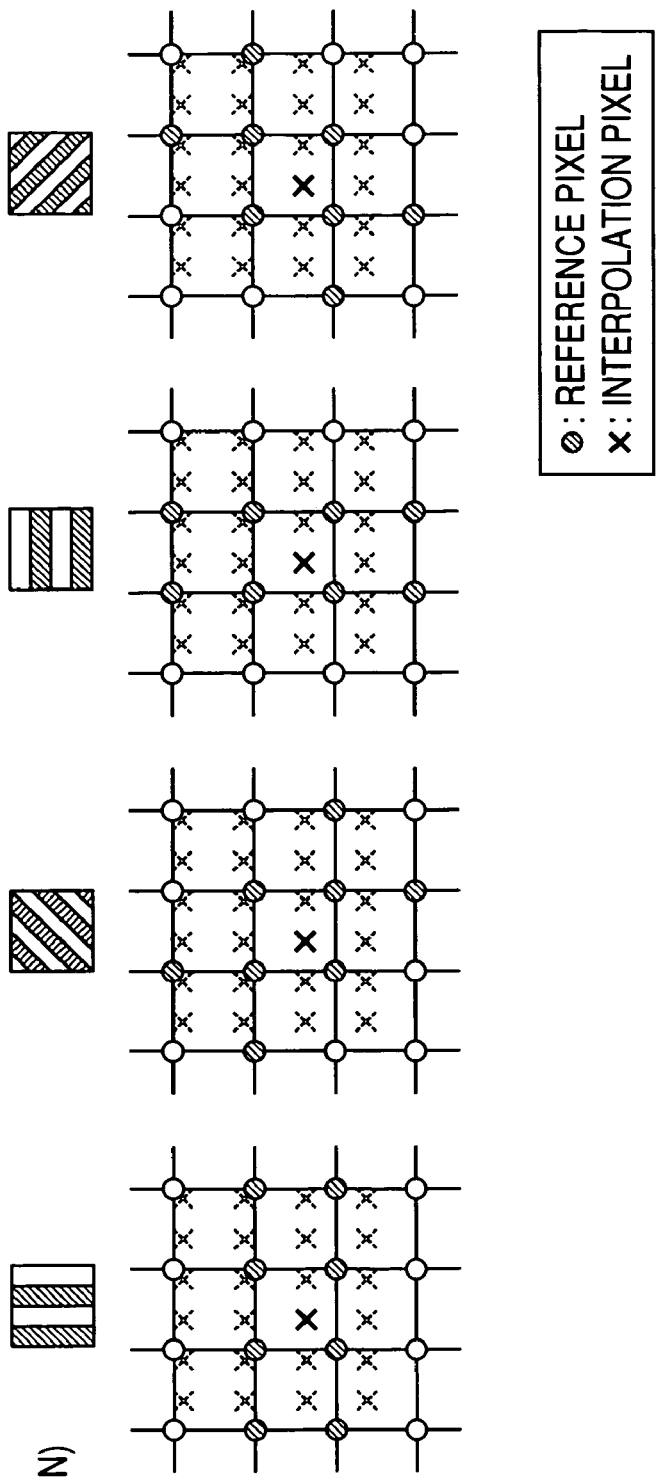
FIGS. 7A, 7B, 7C and 7D are explanatory diagrams 1 of the operation in the second embodiment of the invention.
Figure 8:
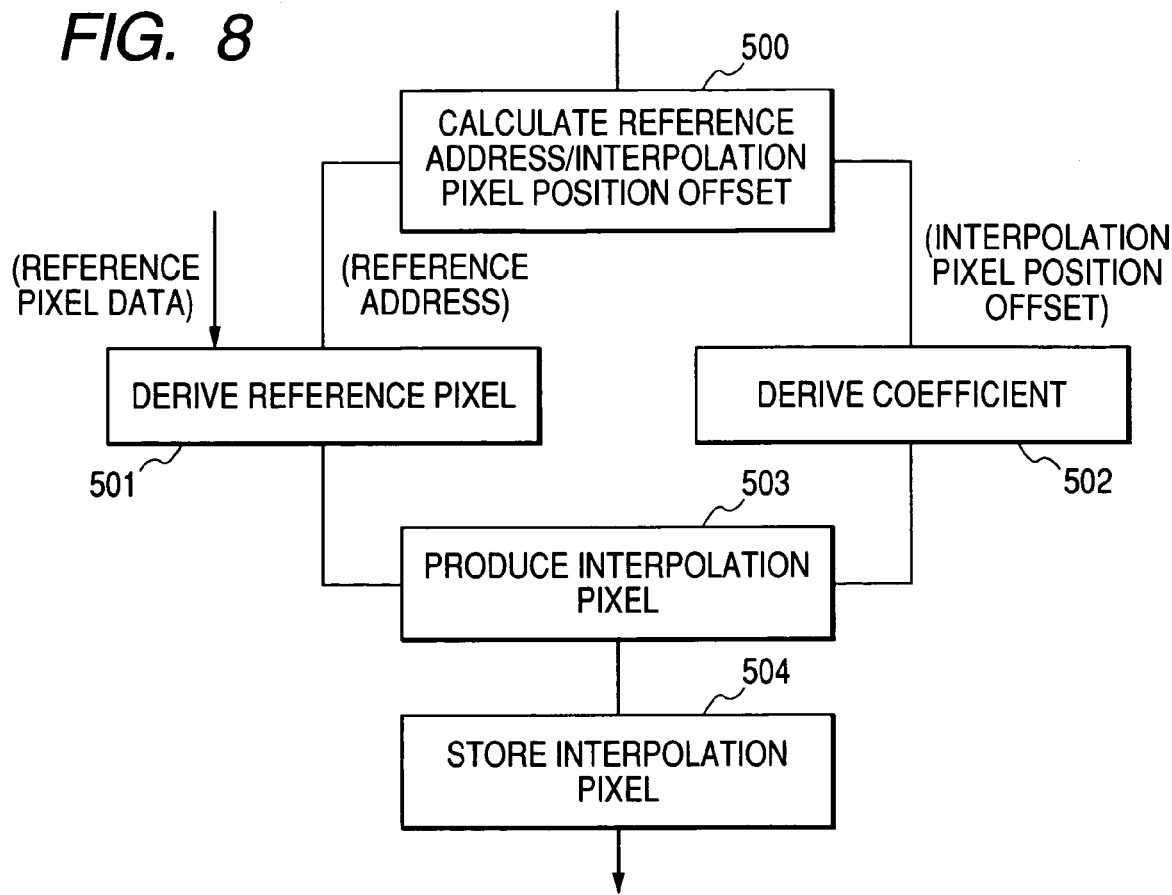
FIG. 8 is a flowchart for a resolution converting process in the first background art.
Figure 9:
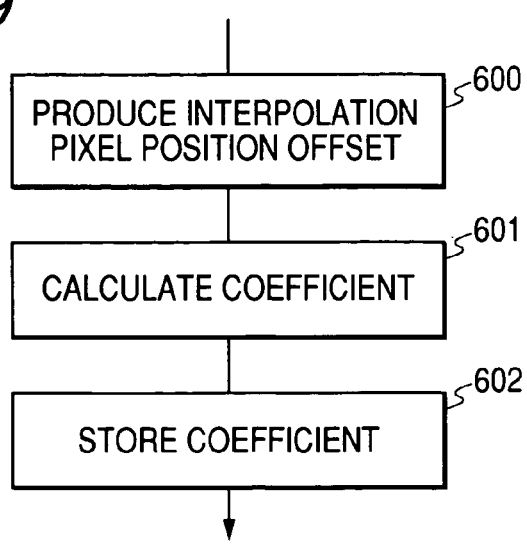
FIG. 9 is a flowchart for a table producing process in the first background art.
Figure 10:
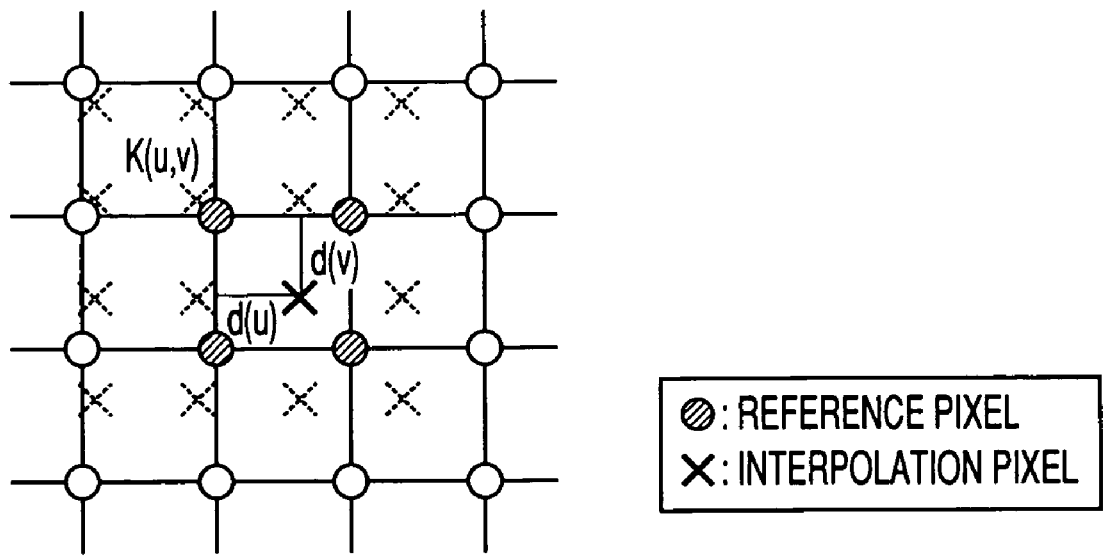
FIG. 10 is an explanatory diagram 1 of the operation in the first background art.
Figure 11:
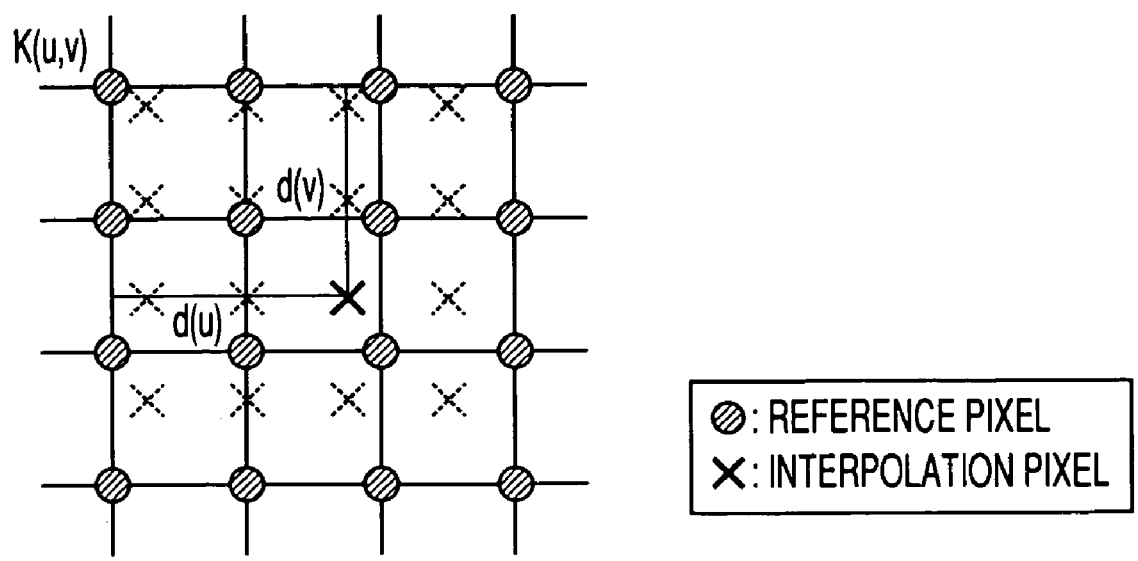
FIG. 11 is an explanatory diagram 1 of the operation in the second background art.
Figure 12:
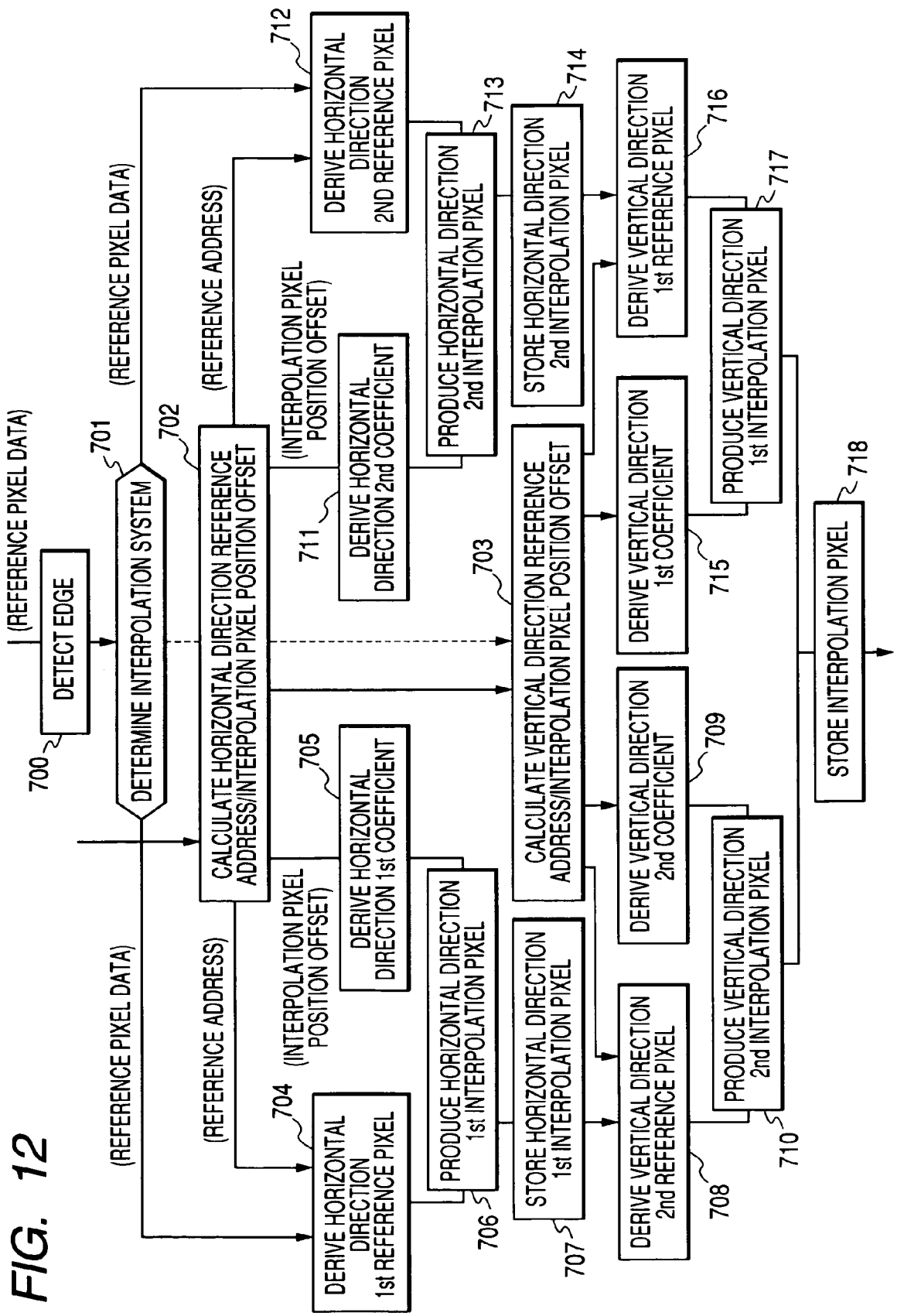
FIG. 12 is a flowchart for a resolution converting process in the third background art.
Figure 13:
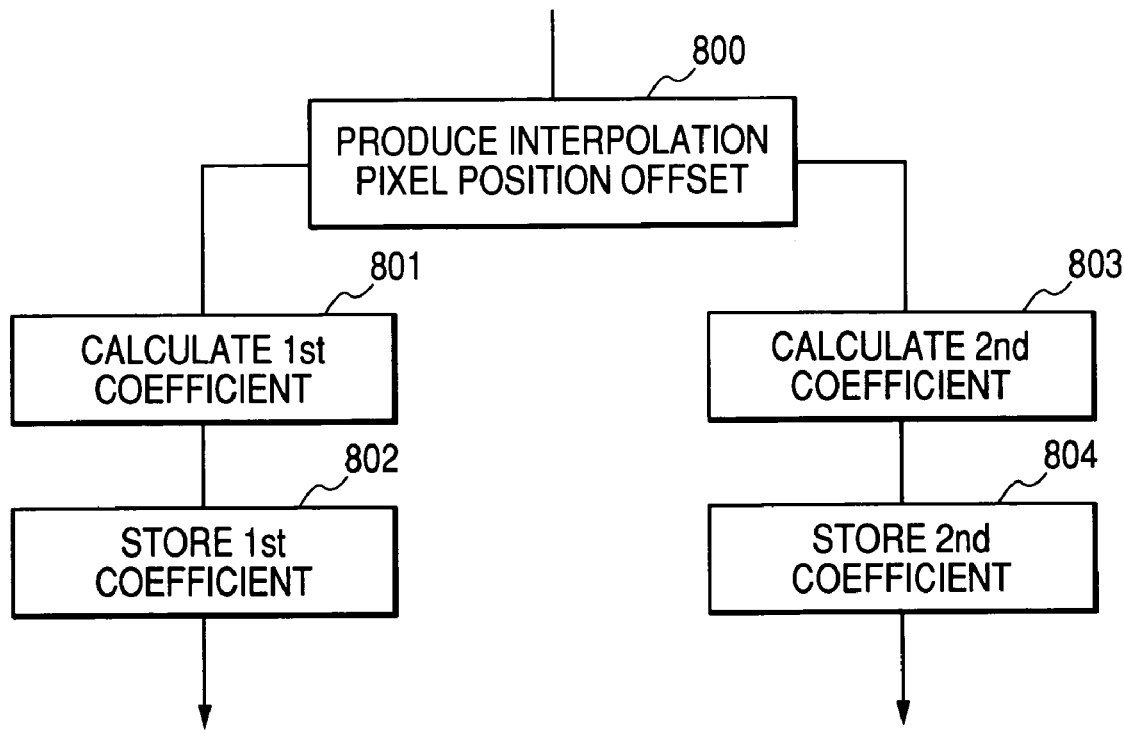
FIG. 13 is a flowchart for a table producing process in the third background art.
Figure 14:
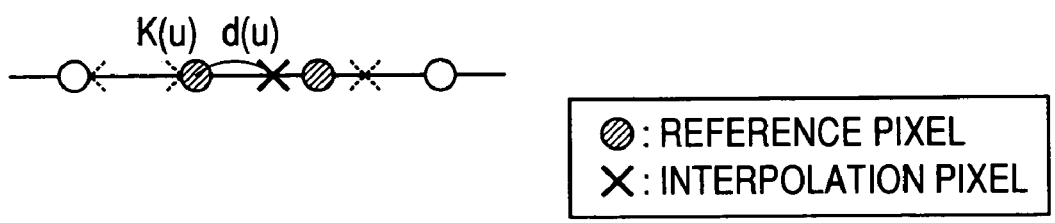
FIG. 14 is an explanatory diagram 1 of the operation in the third background art.
Figure 15:
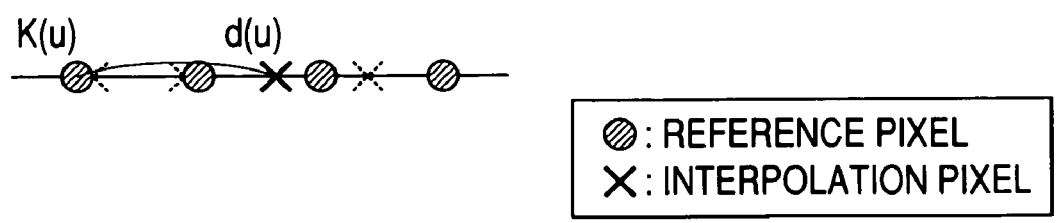
FIG. 15 is an explanatory diagram 2 of the operation in the third background art.
Figure 16A:
FIGS. 16A and 16B are explanatory diagrams 3 of the operation in the third background art.
Figure 16B:

FIG. 5 is a processing flowchart for a resolution converting method according to the embodiment. FIG. 6 is a flowchart for a coefficient table producing process in the resolution converting method.

First, a coefficient table producing method will be described with reference to FIG. 6.

As shown in FIG. 6, in an interpolation pixel position offset producing step 400, a position offset of the interpolation pixel (interpolation pixel position offset) to the reference pixel necessary for producing the table is produced.

In a first coefficient calculating step 401, the corresponding coefficient is calculated in accordance with the interpolation pixel position offset produced in the interpolation pixel position offset producing step 400 as shown in the example of FIG. 4. In a first coefficient storing step 402, the coefficient calculated in the first coefficient calculating step 401 is stored in the corresponding location in the table.

In a second coefficient calculating step 403, the corresponding coefficient is calculated in accordance with the interpolation pixel position offset produced in the interpolation pixel position offset producing step 400 as shown in the example of FIG. 4. In a second coefficient storing step 404, the coefficient calculated in the second coefficient calculating step 403 is stored in the corresponding location in the table.

In a third coefficient calculating step 405, the corresponding coefficient is calculated in accordance with the interpolation pixel position offset produced in the interpolation pixel position offset producing step 400 as shown in the example of FIG. 4. In a third coefficient storing step 406, the coefficient calculated in the third coefficient calculating step 405 is stored in the corresponding location in the table.

In a fourth coefficient calculating step 407, the corresponding coefficient is calculated in accordance with the interpolation pixel position offset produced in the interpolation pixel position offset producing step 400 as shown in the example of FIG. 4. In a fourth coefficient storing step 408, the coefficient calculated in the fourth coefficient calculating step 407 is stored in the corresponding location in the table.

In the first to fourth coefficient calculating steps, for example, the coefficients corresponding to the reference pixel positions shown in the reference patterns shown in FIGS. 7A to 7D are calculated, respectively.

In a manner similar to the first embodiment, the processes until this point are executed when a change in the resolution of the input image data and/or a change in the resolution of the output image data are/is designated and, after that, it is not necessary to execute them until the conditions of the resolution are changed. If the conditions of the resolution conversion are fixed to one or a plurality of conditions, it is proper to preset the foregoing coefficients into the image data processing apparatus.

The resolution converting process using the coefficient table will now be described with reference to FIG. 5.

First, in an edge detecting step 300, an edge direction is calculated from the image before the resolution converting process by using the pixel data for the reference. In a reference pattern determining step 301, as shown in FIGS. 7A to 7D, a reference pattern according to the edge direction detected in the edge detecting step 300 is discriminated. FIGS. 7A to 7D show the edge directions and the reference patterns corresponding thereto, respectively. FIGS. 7A to 7D show the cases where the image includes edge components of the vertical direction, the oblique direction from the right upper position to the left lower position, the horizontal direction, and the oblique direction from the left upper position to the right lower position, respectively. In a manner similar to FIGS. 3A to 3E, the positions of the pixels to be selected are shown by hatched circles.

In a reference address/interpolation pixel position offset calculating step 302, the address of the reference pixel and the position offset of the interpolation pixel (interpolation pixel position offset) to the reference pixel are calculated.

Subsequently, in a coefficient deriving step 303, the coefficients are derived from the coefficient table which has previously been produced in accordance with the reference patterns derived in the reference pattern determining step 301.

In a reference pixel deriving step 304, reference pixel data to be used for the calculation of the pixel data of the interpolation pixel is selected from the reference address calculated in the reference address/interpolation pixel position offset calculating step 302 and the pixel data for the reference which is inputted. This selecting process is executed on the basis of the reference patterns derived in the reference pattern determining step 301.

Subsequently, in an interpolation pixel producing step 305, the coefficient data derived in the coefficient deriving step 303 and the reference pixel data selected in the reference pixel deriving step 304 are used, each reference pixel is multiplied by each of the corresponding coefficients, and the sum of the multiplication results is calculated, thereby obtaining the interpolation pixel data.

Subsequently, in an interpolation pixel storing step 306, the interpolation pixel data produced in the interpolation pixel producing step 305 is stored-into a memory.

Although the method of calculating the coefficients in a lump at the time of production of the table has been shown as a coefficient calculating method in the embodiment, it is also possible to use a method of calculating them simultaneously with the production of the interpolation pixel without producing the table.

Although the method of deriving the coefficients with respect to all of the reference patterns upon production of the table has been shown in the embodiment, it is also possible to use a construction in which with respect to the reference pattern which is symmetrical with respect to the right and left positions or the upper and lower positions, the coefficients are not held as a table but by referring to the coefficients for the symmetrical pattern at the time of referring to the coefficients, the memory for the table can be omitted.

According to the embodiment, by changing a combination of the four adjacent reference pixels which are neighboring to the interpolation pixel and the remote reference pixels which are further away from the interpolation pixel, the interpolation arithmetic operation corresponding to the edge in the oblique direction can be also executed. Thus, the excellent picture quality in which the edge portion is not blurred and the pseudo outline is suppressed can be obtained while suppressing the processing costs.

This application claims priority from Japanese Patent Application Nos. 2004-086901 filed Mar. 24, 2004 and 2005-049507 filed Feb. 24, 2005, which are hereby incorporated by reference herein.

What is claimed is:

1. A resolution converting method of converting a resolution of image data, comprising:

performing by a processor, the steps of:

inputting pixel data of pixels for reference which can be used for calculation of pixel data of an interpolation pixel;

selecting a plurality of reference pixels to be used for the calculation of the pixel data of the interpolation pixel, from the pixels for reference; and calculating the pixel data of the interpolation pixel by using a plurality of the pixel data selected in said selecting step, wherein said selecting step selects the plurality of reference pixels so as to include four adjacent pixels adjacently surrounding the interpolation pixel and another four pixels selected from eight pixels which are arranged at a second closest distance next to the four adjacent pixels from a position of a center of gravity of a rectangular area having vertexes located respectively at the four adjacent pixels and which are at an equal distance from the center of gravity of the rectangular area; and wherein the rectangular area is divided into a plurality of sub-areas, and if two of the four adjacent pixels are arranged respectively at the vertexes of the sub-area where the interpolation pixel is to be arranged, said selecting step selects, from the eight pixels as the another four pixels, two pixels each of which is adjacent at a closest distance to one of two adjacent pixels which are located at the vertexes of the sub-area, and two pixels each of which is adjacent at the closest distance to the other of the two adjacent pixels which are located at the vertexes of the sub-area.

2. A method according to claim 1, wherein one pixel for reference is not selected as a reference pixel in a case that a distance from a position of a center of gravity of said rectangular area is the same as that of another pixel for reference and a distance from a position of a center of gravity of said sub-area is larger than that of said another pixel for reference.

3. A method according to claim 1, wherein the calculation of the pixel data of said interpolation pixel includes at least an interpolation arithmetic operation by a nonlinear function using said selected pixel data for the four adjacent pixels and the reference pixels.

4. A method according to claim 1, wherein the calculation of the pixel data of said interpolation pixel is executed by using a parameter according to a distance between each of said reference pixels and said interpolation pixel.

5. An image data processing apparatus for converting resolution of image data, comprising:

an inputting unit for inputting reference as pixel data of pixels for reference which can be used for calculation of pixel data of an interpolation pixel;

a selection unit for selecting a plurality of reference pixels to be used for the calculation of the pixel data of the interpolation pixel, from the pixels for reference; and an arithmetic operating circuit for calculating the pixel data of the interpolation pixel by using a plurality of the pixel data selected by said selection unit, wherein said selection unit selects the plurality of reference pixels so as to include four adjacent pixels adjacently surrounding the interpolation pixel and another four pixels selected from eight pixels which are arranged at a second closest distance next to the four adjacent pixels from a position of a center of gravity of a rectangular area having vertexes located respectively at the four adjacent pixels and which are at an equal distance from the center of gravity of the rectangular area; and wherein the rectangular area is divided into a plurality of sub-areas, and if two of the four adjacent pixels are arranged respectively at the vertexes of the sub-area where the interpolation pixel is to be arranged, said selection unit selects, from the eight pixels as the another four pixels, two pixels each of which is adjacent at a closest distance to one of two adjacent pixels which are located at the vertexes of the sub-area, and two pixels each of which is adjacent at the closest distance to the other of the two adjacent pixels which are located at the vertexes of the sub-area.

* * * * *